United States Patent
Sano et al.

(10) Patent No.: US 8,138,719 B2
(45) Date of Patent: Mar. 20, 2012

(54) BATTERY STATE MONITORING CIRCUIT AND BATTERY DEVICE

(75) Inventors: Kazuaki Sano, Chiba (JP); Wataru Sakamoto, Chiba (JP); Toshiyuki Koike, Chiba (JP); Muneharu Kawana, Chiba (JP)

(73) Assignee: Seiko Instruments Inc., Chiba (JP)

( * ) Notice: Subject to any disclaimer, the term of this patent is extended or adjusted under 35 U.S.C. 154(b) by 281 days.

(21) Appl. No.: 12/699,593

(22) Filed: Feb. 3, 2010

(65) Prior Publication Data

US 2010/0194343 A1    Aug. 5, 2010

(30) Foreign Application Priority Data

Feb. 4, 2009 (JP) ................ 2009-024042

(51) Int. Cl.
*H02J 7/00* (2006.01)
(52) U.S. Cl. ......... 320/118; 320/116; 320/134; 320/136
(58) Field of Classification Search .................. 320/116, 320/118, 134, 136
See application file for complete search history.

(56) References Cited

U.S. PATENT DOCUMENTS

| | | | |
|---|---|---|---|
| 5,982,142 A | 11/1999 | Sullivan et al. | |
| 8,058,845 B2 * | 11/2011 | Tange et al. | 320/134 |
| 2005/0077878 A1 | 4/2005 | Carrier et al. | |

FOREIGN PATENT DOCUMENTS

| | | |
|---|---|---|
| EP | 2166642 A1 | 3/2010 |
| JP | 2007-178834 A | 7/2007 |
| JP | 2009-195100 A | 8/2009 |
| WO | WO 2009/008314 A1 | 1/2009 |

OTHER PUBLICATIONS

Extended European Search Report for European Application No. 10152541.8, dated Dec. 28, 2010, 4 pages.

* cited by examiner

*Primary Examiner* — M'Baye Diao
(74) *Attorney, Agent, or Firm* — Brinks Hofer Gilson & Lione

(57) ABSTRACT

Provided are a battery state monitoring circuit and a battery device which are capable of inhibiting discharge without enabling an overdischarge cell balance function when an overcurrent detection circuit detects a discharge overcurrent, without the need for an additional terminal of the battery state monitoring circuit. A detection signal of the overcurrent detection circuit is input to each of a communication terminal for overdischarge signal and a communication terminal for overcharge signal included in the battery state monitoring circuit provided on a side of the overcurrent detection circuit. An overdischarge cell balance circuit outputs a cell balance signal when an overdischarge detection signal indicates an overdischarge non-detected state, an overdischarge signal indicates an overdischarge detected state, and an overcharge signal indicates an overcharge non-detected state.

2 Claims, 2 Drawing Sheets

$A_{1\sim n}$···OVERCHARGE DETECTION CIRCUIT
$G_{1\sim n}$···OVERDISCHARGE DETECTION CIRCUIT
$M_{1\sim n}$···CELL BALANCE CIRCUIT
$XC_{1\sim n}$···OVERDISCHARGE CELL BALANCE CIRCUIT

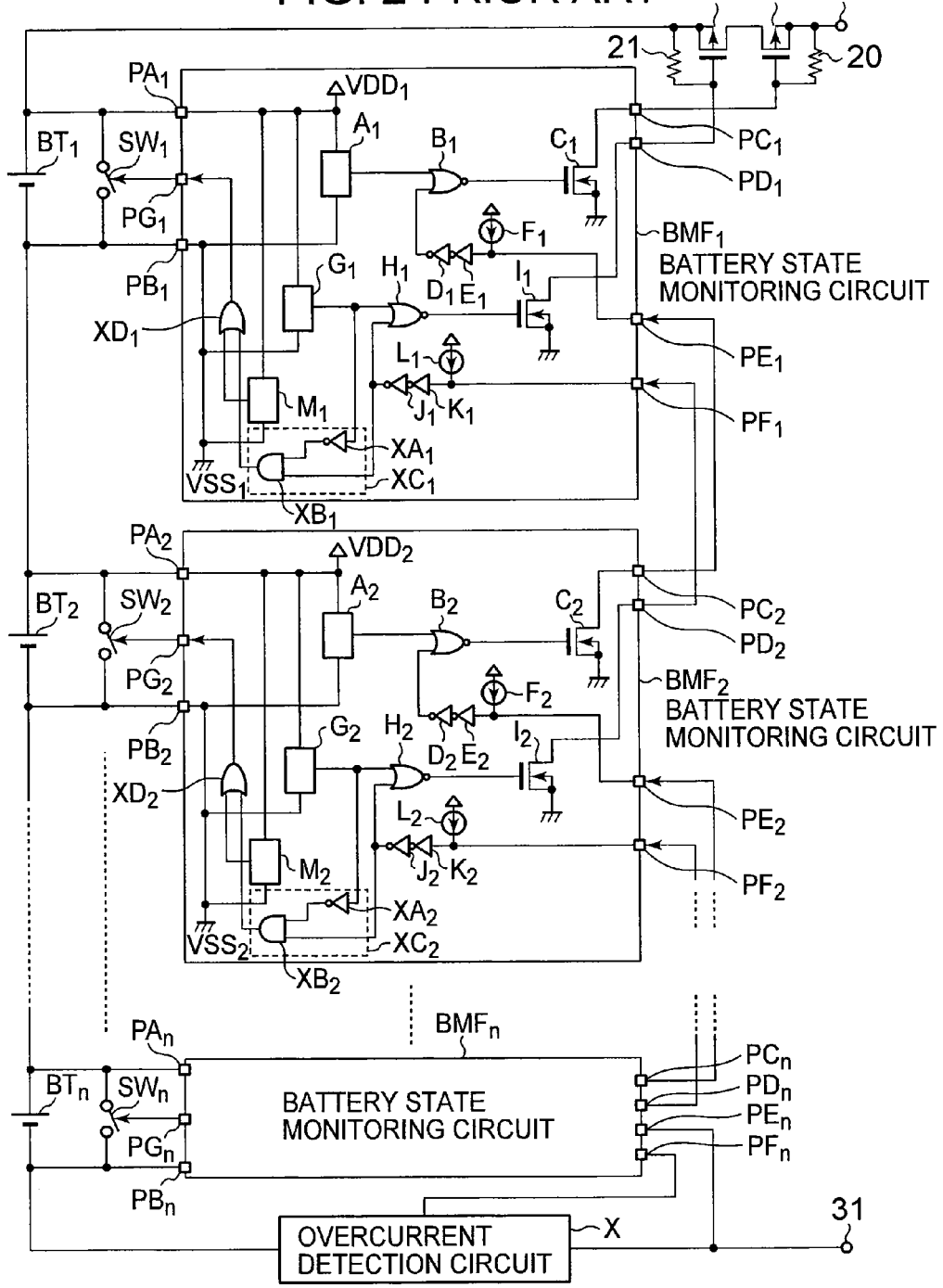

US 8,138,719 B2

BATTERY STATE MONITORING CIRCUIT AND BATTERY DEVICE

RELATED APPLICATIONS

This application claims priority under 35 U.S.C. §119 to Japanese Patent Application No. 2009-024042 filed on Feb. 4, 2009, the entire content of which is hereby incorporated by reference.

BACKGROUND OF THE INVENTION

1. Field of the Invention

The present invention relates to a battery state monitoring circuit for monitoring a battery state, and a battery device provided with a plurality of the battery state monitoring circuits.

2. Description of the Related Art

FIG. 2 illustrates a circuit diagram of a conventional battery device including battery state monitoring circuits.

The battery device includes n batteries $BT_1$ to $BT_n$ that are connected in series, n switches (cell balance switch circuits) $SW_1$ to $SW_n$ that are respectively connected in parallel with the batteries $BT_1$ to $BT_n$, n battery state monitoring circuits $BMF_1$ to $BMF_n$ that are individually provided in correspondence with the batteries $BT_1$ to $BT_n$, a first transistor (charging P-channel transistor) 10, a second transistor (discharging P-channel transistor) 11, a first resistive element (first bias resistive element) 20, a second resistive element (second bias resistive element) 21, an overcurrent detection circuit X, a first external terminal 30, and a second external terminal 31.

The battery state monitoring circuit $BMF_1$ includes an overcharge detection circuit $A_1$, a first NOR circuit $B_1$, a first output transistor $C_1$, a first inverter $D_1$, a second inverter $E_1$, a first current source $F_1$, an overdischarge detection circuit $G_1$, a second NOR circuit $H_1$, a second output transistor $I_1$, a third inverter $J_1$, a fourth inverter $K_1$, a second current source $L_1$, a cell balance circuit $M_1$, an overdischarge cell balance circuit $XC_1$, a first OR circuit $XD_1$, a first voltage monitoring terminal $PA_1$, a second voltage monitoring terminal $PB_1$, a first transmitting terminal $PC_1$, a second transmitting terminal $PD_1$, a first receiving terminal $PE_1$, a second receiving terminal $PF_1$, and a control terminal $PG_1$. The battery state monitoring circuit $BMF_1$ including the above-mentioned components is formed as a one-chip IC (semiconductor device). Note that, of the above-mentioned components, the first NOR circuit $B_1$, the first output transistor $C_1$, the first inverter $D_1$, the second inverter $E_1$, and the first current source $F_1$ together form an overcharge information communication circuit. Further, the second NOR circuit $H_1$, the second output transistor $I_1$, the third inverter $J_1$, the fourth inverter $K_1$, and the second current source $L_1$ together form an overdischarge information communication circuit.

The overdischarge cell balance circuit $XC_1$ includes a fifth inverter $XA_1$ and a first AND circuit $XB_1$. The first OR circuit $XD_1$ receives respective outputs of the overdischarge cell balance circuit $XC_1$ and the cell balance circuit $M_1$, and outputs a control signal to the switch $SW_1$ via the control terminal $PG_1$.

The other battery state monitoring circuits $BMF_2$ to $BMF_n$ each include the same components as those of the battery state monitoring circuit $BMF_1$, and hence are illustrated similarly, except for different reference symbols. For example, the overcharge detection circuit included in the battery state monitoring circuit $BMF_2$ is denoted by reference symbol $A_2$, and the overcharge detection circuit included in the battery state monitoring circuit $BMF_n$ is denoted by reference symbol $A_n$. The same holds true for the other components.

The battery state monitoring circuit $BMF_n$ is not connected with a battery state monitoring circuit that outputs signals to be transmitted to the first receiving terminal $PE_n$ and the second receiving terminal $PF_n$. Therefore, the first receiving terminal $PE_n$ for receiving an overcharge detection signal is pulled down.

The overcurrent detection circuit X is provided on a discharge path between the first external terminal 30 and the second external terminal 31. An output terminal of the overcurrent detection circuit X is connected to the second receiving terminal $PF_n$ of the battery state monitoring circuit $BMF_n$. The overcurrent detection circuit X is configured to detect an overcurrent based on voltage, and hence includes, for example, an element for converting current into voltage, such as a resistive element, and a comparator circuit for detecting the voltage.

The battery device illustrated in FIG. 2 performs discharge or charge when a load or a charger is connected between the first external terminal 30 and the second external terminal 31.

In a normal state, that is, in a case where all of voltages of the batteries $BT_1$ to $BT_n$ fall within a voltage range lower than an overcharge voltage and equal to or higher than an overdischarge voltage, the overcharge detection circuit $A_1$ included in the battery state monitoring circuit $BMF_1$ outputs the overcharge detection signal of Low to the first NOR circuit $B_1$.

On this occasion, the first output transistor $C_2$ included in the battery state monitoring circuit $BMF_2$ has been turned ON (the reason is described later), and hence an input terminal of the second inverter $E_1$ included in the battery state monitoring circuit $BMF_1$ becomes Low. Therefore, the first inverter $D_1$ outputs an output signal of Low to the first NOR circuit $B_1$. Because the first NOR circuit $B_1$ receives the overcharge detection signal of Low and the output signal of Low of the first inverter $D_1$ as inputs, the first NOR circuit $B_1$ outputs a NOR signal of High to a gate terminal of the first output transistor $C_1$. Then, the first output transistor $C_1$ is turned ON, and the first transmitting terminal $PC_1$ becomes Low. As a result, the first transistor 10 is turned ON.

The reason why the first output transistor $C_2$ included in the battery state monitoring circuit $BMF_2$ has been turned ON is described below. The first receiving terminal $PE_n$ of the battery state monitoring circuit $BMF_n$ provided at the lowermost stage is connected with a negative terminal of the battery $BT_n$, and hence the input terminal of the second inverter $E_n$ is continuously kept at Low. Therefore, the first inverter $D_n$ continuously outputs the output signal of Low to the first NOR circuit $B_n$, and the overcharge detection circuit $A_n$ outputs the overcharge detection signal of Low to the first NOR circuit $B_n$. Accordingly, the first NOR circuit $B_n$ outputs the NOR signal of High to the gate terminal of the first output transistor $C_n$, and then the first output transistor $C_n$ included in the battery state monitoring circuit $BMF_n$ is turned ON.

Because the first output transistor $C_n$ is turned ON, the input terminal of the second inverter $E_{n-1}$ included in the battery state monitoring circuit $BMF_{n-1}$ becomes Low. Therefore, the first inverter $D_{n-1}$ outputs the output signal of Low to the first NOR circuit $B_{n-1}$. Similarly, the overcharge detection circuit $A_{n-1}$ outputs the overcharge detection signal of Low to the first NOR circuit $B_{n-1}$. Accordingly, the first NOR circuit $B_{n-1}$ outputs the NOR signal of High to the gate terminal of the first output transistor $C_{n-1}$. Then, the first output transistor $C_{n-1}$ included in the battery state monitoring circuit $BMF_{n-1}$ is turned ON.

The operations described above are repeatedly performed in a battery state monitoring circuit provided on an upper stage side and a battery state monitoring circuit provided on a lower stage side, and the first output transistor $C_2$ included in the battery state monitoring circuit $BMF_2$ is eventually turned ON.

On the other hand, in the normal state described above, the overdischarge detection circuit $G_1$ included in the battery state monitoring circuit $BMF_1$ outputs an overdischarge detection signal of Low to the second NOR circuit $H_1$. On this occasion, the second output transistor $I_2$ included in the battery state monitoring circuit $BMF_2$ has also been turned ON, and hence the input terminal of the fourth inverter $K_1$ included in the battery state monitoring circuit $BMF_1$ becomes Low. Therefore, the third inverter $J_1$ outputs an output signal of Low to the second NOR circuit $H_1$. Because the second NOR circuit $H_1$ receives the overdischarge detection signal of Low and the output signal of Low of the third inverter $J_1$ as inputs, the second NOR circuit $H_1$ outputs a NOR signal of High to a gate terminal of the second output transistor $I_1$. Then, the second output transistor $I_1$ is turned ON, and the second transmitting terminal $PD_1$ becomes Low. As a result, the second transistor 11 is turned ON.

As described above, in the normal state, because the first transistor 10 and the second transistor 11 are turned ON, the battery device becomes a chargeable and dischargeable state.

Next, description is given of an overdischarged state, that is, a case where the load is connected between the first external terminal 30 and the second external terminal 31 to thereby discharge the batteries $BT_1$ to $BT_n$, and at least one voltage of the batteries $BT_1$ to $BT_n$ becomes lower than the overdischarge voltage. Note that the following description is given under the assumption that the voltage of the battery $BT_1$ is higher than the overdischarge voltage while the voltage of the battery $BT_2$ becomes lower than the overdischarge voltage.

In this case, the overdischarge detection circuit $G_2$ included in the battery state monitoring circuit $BMF_2$ outputs the overdischarge detection signal of High to the second NOR circuit $H_2$. Then, the second NOR circuit $H_2$ outputs the NOR signal of Low to the gate terminal of the second output transistor $I_2$. Accordingly, the second output transistor $I_2$ is turned OFF.

The input terminal of the fourth inverter $K_1$ is pulled up to High by the second current source $L_1$, and the third inverter $J_1$ outputs the output signal of High to the second NOR circuit $H_1$. Then, the second NOR circuit $H_1$ outputs the NOR signal of Low to the gate terminal of the second output transistor $I_1$. Accordingly, the second output transistor $I_1$ is turned OFF.

When the second output transistor $I_1$ is turned OFF as described above, a gate of the second transistor 11 becomes High due to the second resistive element 21, and as a result, the second transistor 11 is turned OFF, to thereby inhibit the discharge to the load.

On the other hand, because the voltage of the battery $BT_1$ is higher than the overdischarge voltage, the overdischarge detection circuit $G_1$ outputs the overdischarge detection signal of Low. Therefore, the first AND circuit $XB_1$ receives a signal of High from the fifth inverter $XA_1$ and the signal of High from the third inverter $J_1$ as inputs, and hence the first AND circuit $XB_1$ outputs a signal of High, that is, an overdischarge cell balance signal to the first OR circuit $XD_1$.

In this case, when receiving the overdischarge cell balance signal, the first OR circuit $XD_1$ turns ON the switch $SW_1$ via the control terminal $PG_1$ so that the battery $BT_1$ may be discharged via the switch $SW_1$. When the discharge proceeds until the voltage of the battery $BT_1$ reaches the overdischarge voltage, the overdischarge detection circuit $G_1$ outputs the overdischarge detection signal of High. As a result, the first OR circuit $XD_1$ turns OFF the switch $SW_1$ via the control terminal $PG_1$ so that the discharge may be stopped.

Through the operations described above, both the voltages of the battery $BT_1$ and the battery $BT_2$ become approximate to the overdischarge voltage. The cell balance is obtained as described above so that the battery device may be allowed to operate for a longer time.

The overcurrent detection circuit X detects an excessive discharge current (hereinafter, referred to as "overcurrent") flowing into the load connected between the first external terminal 30 and the second external terminal 31 of the battery device. In a state where the overcurrent is not detected, the overcurrent detection circuit X pulls down the second receiving terminal $PF_n$ to Low. If the overcurrent occurs, the overcurrent detection circuit X stops pulling down the second receiving terminal $PF_n$, to thereby transmit overcurrent detection information to the battery state monitoring circuit $BMF_n$.

Then, the second current source $L_n$ pulls up the input terminal of the fourth inverter $K_n$ so that the signal may be transmitted to the battery state monitoring circuit $BMF_{n-1}$ provided at the subsequent stage via the overdischarge information communication circuit included in the battery state monitoring circuit $BMF_n$. Finally, the battery state monitoring circuit $BMF_1$ inhibits the discharge to the load (see, for example, Japanese Patent Application No. 2007-178834).

However, in the example of FIG. 2, there is a problem that the discharge of the respective batteries may proceed because the cell balance switch circuits $SW_1$ to $SW_n$ for the batteries are turned ON at the same timing when the discharge to the load is inhibited upon the detection of the overcurrent.

Specifically, when the battery state monitoring circuits $BMF_1$ to $BMF_n$ receive the signals via the corresponding second receiving terminals $PF_1$ to $PF_n$, the battery state monitoring circuit cannot discriminate which of the overdischarge detection and the overcurrent detection the signal results from. Therefore, even when the discharge needs to be stopped because of the overcurrent detection, the battery state monitoring circuits may each determine that any one of the battery state monitoring circuits has detected the overdischarge. Then, the overdischarge cell balance signal is output to turn ON the cell balance switch circuit. In this case, all the voltages of the batteries decrease to as low as the overdischarge voltage after the overcurrent has been detected. Therefore, the battery device cannot be used until the voltages of the batteries are charged to be recovered, resulting in significantly worse usability.

SUMMARY OF THE INVENTION

The present invention has been made in view of the above-mentioned circumstances, and has an object to provide a battery state monitoring circuit and a battery device which may maintain satisfactory usability even with an overcurrent detection function being added thereto.

In order to achieve the above-mentioned object, the present invention provides a battery state monitoring circuit, which is provided in correspondence with each of a plurality of batteries connected in series, including: an overcharge detection circuit that outputs an overcharge detection signal; an overdischarge detection circuit that outputs an overdischarge detection signal; an overdischarge cell balance circuit; an overcharge information communication circuit that transmits an overcharge signal that has been received via a first receiving terminal, from a first transmitting terminal to an outside; and an overdischarge information communication circuit that transmits an overdischarge signal that has been received via a second receiving terminal, from a second transmitting terminal to the outside, in which the overdischarge cell balance circuit outputs a cell balance signal when the overdischarge detection signal indicates an overdischarge non-detected state, the overdischarge signal indicates an overdischarge detected state, and the overcharge signal indicates an overcharge non-detected state.

According to the present invention, discharge may be inhibited without enabling an overdischarge cell balance function when an overcurrent detection circuit detects a discharge overcurrent, without the need for an additional terminal of the battery state monitoring circuit.

BRIEF DESCRIPTION OF THE DRAWINGS

In the accompanying drawings:

FIG. 2 illustrates a circuit diagram of a conventional battery device.

DETAILED DESCRIPTION OF THE PREFERRED EMBODIMENTS

Figure 1:
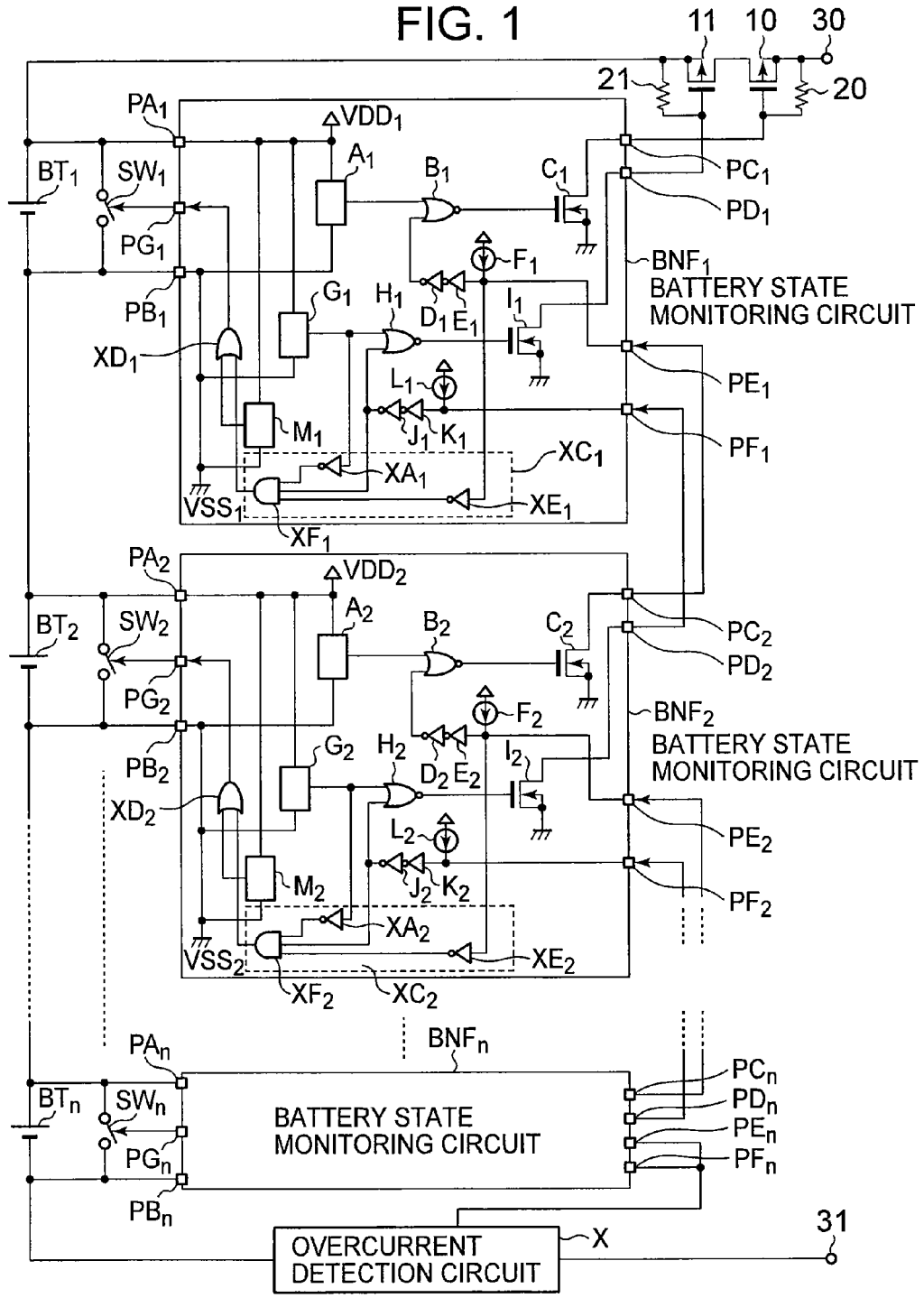
FIG. 1 illustrates a circuit diagram of a battery device according to an embodiment of the present invention.

FIG. 1 illustrates a circuit diagram of a battery device according to an embodiment of the present invention.

The battery device according to the embodiment of the present invention includes n batteries $BT_1$ to $BT_n$ that are connected in series, n switches (cell balance switch circuits) $SW_1$ to $SW_n$ that are respectively connected in parallel with the batteries $BT_1$ to $BT_n$, n battery state monitoring circuits $BNF_1$ to $BNF_n$ that are individually provided in correspondence with the batteries $BT_1$ to $BT_n$, a first transistor (charging P-channel transistor) 10, a second transistor (discharging P-channel transistor) 11, a first resistive element (first bias resistive element) 20, a second resistive element (second bias resistive element) 21, an overcurrent detection circuit X, a first external terminal 30, and a second external terminal 31.

The battery state monitoring circuit $BNF_1$ includes an overcharge detection circuit $A_1$, a first NOR circuit $B_1$, a first output transistor $C_1$, a first inverter $D_1$, a second inverter $E_1$, a first current source $F_1$, an overdischarge detection circuit $G_1$, a second NOR circuit $H_1$, a second output transistor $I_1$, a third inverter $J_1$, a fourth inverter $K_1$, a second current source $L_1$, a cell balance circuit $M_1$, an overdischarge cell balance circuit $XC_1$, a first OR circuit $XD_1$, a first voltage monitoring terminal $PA_1$, a second voltage monitoring terminal $PB_1$, a first transmitting terminal $PC_1$, a second transmitting terminal $PD_1$, a first receiving terminal $PE_1$, a second receiving terminal $PF_1$, and a control terminal $PG_1$. The battery state monitoring circuit $BNF_1$ including the above-mentioned components is formed as a one-chip IC (semiconductor device). Note that, of the above-mentioned components, the first NOR circuit $B_1$, the first output transistor $C_1$, the first inverter $D_1$, the second inverter $E_1$, and the first current source $F_1$ together form an overcharge information communication circuit. Further, the second NOR circuit $H_1$, the second output transistor $I_1$, the third inverter $J_1$, the fourth inverter $K_1$, and the second current source $L_1$ together form an overdischarge information communication circuit.

The overdischarge cell balance circuit $XC_1$ includes a fifth inverter $XA_1$, a sixth inverter $XE_1$, and a second AND circuit $XF_1$ having three input terminals. The input terminals of the second AND circuit $XF_1$ are respectively connected with an output terminal of the overdischarge detection circuit $G_1$ via the fifth inverter $XA_1$, with the second receiving terminal $PF_1$ via the third inverter $J_1$ and the fourth inverter $K_1$, and with the first receiving terminal $PE_1$ via the sixth inverter $XE_1$.

The first OR circuit $XD_1$ receives respective outputs of the overdischarge cell balance circuit $XC_1$ and the cell balance circuit $M_1$, and outputs a control signal to the switch $SW_1$ via the control terminal $PG_1$.

The other battery state monitoring circuits $BNF_2$ to $BNF_n$ each include the same components as those of the battery state monitoring circuit $BNF_1$, and hence are illustrated similarly, except for different reference symbols. For example, the overcharge detection circuit included in the battery state monitoring circuit $BNF_2$ is denoted by reference symbol $A_2$, and the overcharge detection circuit included in the battery state monitoring circuit $BNF_n$ is denoted by reference symbol $A_n$. The same holds true for the other components.

The overcurrent detection circuit X is provided on a discharge path between the first external terminal 30 and the second external terminal 31. An output terminal of the overcurrent detection circuit X is connected to the first receiving terminal $PE_n$ and the second receiving terminal $PF_n$ of the battery state monitoring circuit $BNF_n$. The overcurrent detection circuit X is configured to detect an overcurrent based on voltage, and hence includes, for example, an element for converting current into voltage, such as a resistive element, and a comparator circuit for detecting the voltage.

The battery device according to the embodiment of the present invention performs discharge or charge when a load or a charger is connected between the first external terminal 30 and the second external terminal 31. The battery device according to the embodiment of the present invention performs the same operations as those of the conventional battery device except when the overcurrent is detected, and hence repetitive description thereof is omitted.

Description is given of operations of the battery device according to the embodiment of the present invention performed when the overcurrent is detected.

In a state where the overcurrent is not detected, the overcurrent detection circuit X pulls down the first receiving terminal $PE_n$ and the second receiving terminal $PF_n$ to Low.

When detecting the overcurrent, the overcurrent detection circuit X outputs the voltage of High from its output terminal. Accordingly, the second receiving terminal $PF_n$ of the battery state monitoring circuit $BNF_n$ provided at the end stage becomes High, to thereby transmit, to the battery state monitoring circuit $BNF_n$, the overcurrent detection information, that is, the inhibition of the discharge. Then, the second current source $L_n$ pulls up the input terminal of the fourth inverter $K_n$ so that the signal may be transmitted to the battery state monitoring circuit $BNF_{n-1}$ provided at the subsequent stage via the overdischarge information communication circuit included in the battery state monitoring circuit $BNF_n$. Finally, the battery state monitoring circuit $BNF_1$ turns OFF the second transistor 11 so that the discharge to the load may be inhibited.

When the voltage of the battery $BT_n$ is higher than the overdischarge voltage, the overdischarge detection circuit $G_n$ outputs the signal of Low. Therefore, the second AND circuit $XF_n$ receives the signal of High from the fifth inverter $XA_n$ and the signal of High from the third inverter $J_n$ as inputs.

In the battery device, the overcurrent detection circuit X is connected also to the first receiving terminal $PE_n$ of the battery state monitoring circuit $BNF_n$ provided at the end stage. Thus, when the overcurrent detection circuit X changes the voltage of the first receiving terminal $PE_n$ to High, the output of the sixth inverter $XE_n$ becomes Low, and hence the output of the second AND circuit $XF_n$ does not change to High. Therefore, the output of the first OR circuit $XD_n$ is kept at Low even when the overcurrent is detected, and hence the switch $SW_n$ is kept from being turned ON so that the overdischarge cell balance function may be disabled.

Further, the signal is transmitted also to the battery state monitoring circuit $BNF_{n-1}$ provided at the subsequent stage via the overcharge information communication circuit included in the battery state monitoring circuit $BNF_n$, and hence the cell balance switch $SW_{n-1}$ for the battery state monitoring circuit $BNF_{n-1}$ is also kept from being turned ON similarly to the switch $SW_n$.

As described above, according to the present invention illustrated in FIG. 1, by merely adding a simple circuit to the overdischarge cell balance circuit, the overdischarge cell balance function may be disabled at the time of overcurrent detection, resulting in improved usability.

What is claimed is:

1. A battery state monitoring circuit, comprising:
a first voltage monitoring terminal used for connection with a positive terminal of one battery;
a second voltage monitoring terminal used for connection with a negative terminal of the one battery;
a first transmitting terminal;
a second transmitting terminal;
a first receiving terminal;
a second receiving terminal;
a control terminal;
an overcharge detection circuit that detects whether or not the one battery is in an overcharged state based on a voltage between the first voltage monitoring terminal and the second voltage monitoring terminal, and outputs an overcharge detection signal indicative of a result of the detecting;
an overdischarge detection circuit that detects whether or not the one battery is in an overdischarged state based on the voltage between the first voltage monitoring terminal and the second voltage monitoring terminal, and outputs an overdischarge detection signal indicative of a result of the detecting;
an overdischarge cell balance circuit that detects whether or not cell balance control needs to be performed on the one battery based on the voltage between the first voltage monitoring terminal and the second voltage monitoring terminal, and outputs a cell balance signal indicative of a result of the detecting to the control terminal;
an overcharge information communication circuit that transmits, when at least one of an overcharge signal indicative of whether or not another battery is in the overcharged state, which has been received via the first receiving terminal, and the overcharge detection signal indicates that at least one of the another battery and the one battery is in the overcharged state, an overcharge signal indicating that the at least one of the another battery and the one battery is in the overcharged state, from the first transmitting terminal to an outside; and
an overdischarge information communication circuit that transmits, when at least one of an overdischarge signal indicative of whether or not the another battery is in the overdischarged state, which has been received via the second receiving terminal, and the overdischarge detection signal indicates that at least one of the another battery and the one battery is in the overdischarged state, an overdischarge signal indicating that the at least one of the another battery and the one battery is in the overdischarged state, from the second transmitting terminal to the outside,
wherein the overdischarge cell balance circuit is configured to:
receive, as inputs, the overdischarge detection signal, the overdischarge signal received via the second receiving terminal, and the overcharge signal received via the first receiving terminal; and
output the cell balance signal when the overdischarge detection signal indicates an overdischarge non-detected state, the overdischarge signal received via the second receiving terminal indicates an overdischarge detected state, and the overcharge signal received via the first receiving terminal indicates an overcharge non-detected state.

2. A battery device, comprising:
a first external terminal;
a second external terminal;
a plurality of batteries that are connected in series;
the battery state monitoring circuit according to claim 1 that is provided in correspondence with each of the plurality of batteries;
a cell balance switch circuit that is connected in parallel with the each of the plurality of batteries, for switching between connection and disconnection of two terminals thereof in accordance with a cell balance signal output from the control terminal of the battery state monitoring circuit provided in correspondence with the each of the plurality of batteries;
a charging switch circuit that is provided between the first external terminal and the plurality of batteries, for switching between allowance and inhibition of charge into the plurality of batteries;
a discharging switch circuit that is provided between the first external terminal and the plurality of batteries, for switching between allowance and inhibition of discharge from the plurality of batteries; and
an overcurrent detection circuit that is provided between the second external terminal and the plurality of batteries, for detecting whether or not a discharge overcurrent is flowing from the plurality of batteries, and outputting an overcurrent detection signal indicative of a result of the detecting,
wherein the battery state monitoring circuit is configured so that:
the first voltage monitoring terminal is connected to a positive terminal of the corresponding one of the plurality of batteries;
the second voltage monitoring terminal is connected to a negative terminal of the corresponding one of the plurality of batteries;
the first transmitting terminal is connected to the first receiving terminal of one of adjacent battery state monitoring circuits;
the second transmitting terminal is connected to the second receiving terminal of the one of the adjacent battery state monitoring circuits;
the first receiving terminal is connected to the first transmitting terminal of another one of the adjacent battery state monitoring circuits; and
the second receiving terminal is connected to the second transmitting terminal of the another one of the adjacent battery state monitoring circuits, and
wherein the overcurrent detection circuit includes an output terminal that is connected to each of the first receiving terminal and the second receiving terminal of the battery state monitoring circuit for the battery provided on a side of the second external terminal among the plurality of batteries connected in series.

* * * * *